2,992,277
PARAFORMALDEHYDE MANUFACTURE
Harold F. Porter, Newark, Del., assignor to E. I. du Pont de Nemours and Company, Wilmington, Del., a corporation of Delaware
Filed Apr. 28, 1959, Ser. No. 809,518
5 Claims. (Cl. 260—615.5)

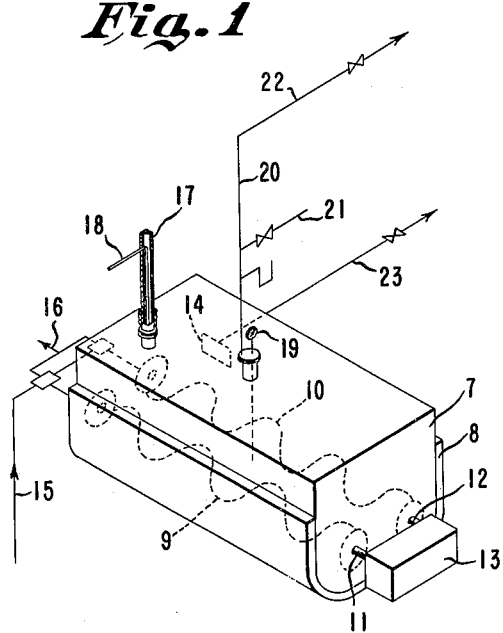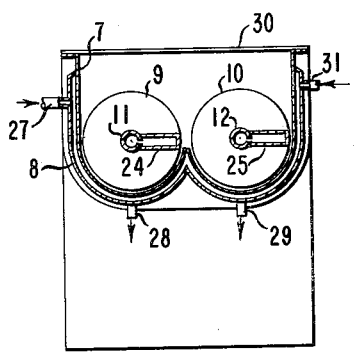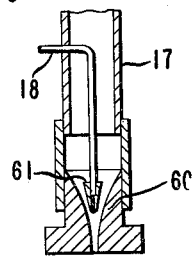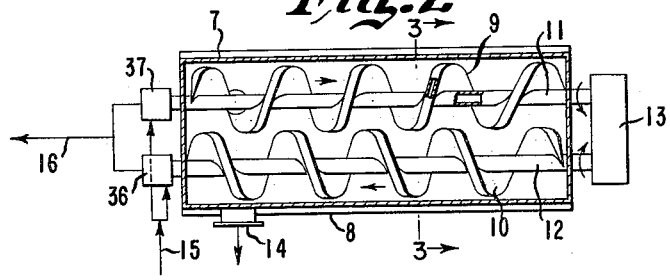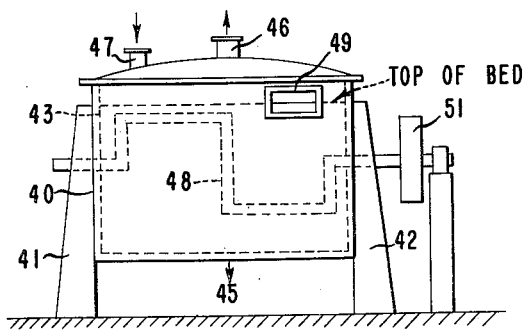
INVENTOR
HAROLD F. PORTER

This invention relates to the production of paraformaldehyde, and more particularly it relates to the production of substantially dust-free granular paraformaldehyde. Paraformaldehyde produced by the process of this invention has a formaldehyde concentration of between 90% and 99% formaldehyde depending upon operating conditions of the process, is very uniform in physical and chemical composition and is substantially dust-free.

Paraformaldehyde is usually produced by the concentration of aqueous formaldehyde solutions at an elevated temperature and often under vacuum. Caustic soda and similar basic materials are often used as catalysts to cause the formaldehyde to polymerize more quickly. In prior known paraformaldehyde processes the paraformaldehyde either sets up in a solid mass which has to be ground to a desired particle size or the paraformaldehyde is obtained by a flaking process or as a slurry in an organic liquid.

It is an object of this invention to produce a dry, granular, uniform paraformaldehyde in a continuous process.

It is another object of this invention to produce a dry, granular, uniform paraformaldehyde in a single continuous step from a concentrated solution of formaldehyde.

Other objects of the invention will appear hereinafter.

The objects of this invention may be accomplished by creating a continuously moving bed of paraformaldehyde particles, flowing a concentrated aqueous formaldehyde solution onto said moving bed of particles in a continuous manner and flowing said solid paraformaldehyde particles from said bed into a collector.

The continuously moving bed of particles of paraformaldehyde is heated and continuously maintained at a substantially constant temperature between 50° C. and 105° C. It is furthermore preferred that the aqueous solution of formaldehyde have a concentration of at least 65% formaldehyde and that a basic catalyst be added thereto substantially simultaneously with its flow onto the bed of moving particles.

The following description when taken in connection with the accompanying drawings set forth in detail the preferred embodiments of this invention.

Referring to the drawings,

FIG. 1 is a diagrammatic perspective view of one embodiment of apparatus suitable for use in the continuous agitation of a mass of paraformaldehyde particles.

FIG. 2 is a plan view of the helical screws shown in the apparatus of FIG. 1.

FIG. 3 is a cross-sectional view taken along the line 3—3 of FIG. 2.

FIG. 4 is a diagrammatic elevational view of another embodiment of apparatus suitable for use in carrying out the process of this invention.

FIG. 5 is an enlarged cross-section of a part of FIG. 1 showing details.

In FIGS. 1, 2 and 3 of the drawings, reference numeral 7 designates the enclosed shell and 8 the jacket of a thermo-screw type of apparatus in which the jacketed shell may be heated by passing hot water, steam, oil or other heating medium through inlets 27 and 31 into the jacket and removing condensate through outlets 28 and 29 or cooled liquid medium from properly placed outlets. The two thermo screws 9 and 10 are hollow and are rotatable on journals 11 and 12 respectively, journaled in a vari-speed drive mechanism represented generally at 13.

Steam, or other heating medium, may be passed into the hollow helical screws through inlet 15 into journal bearings 36 and 37 and into the hollow shafts 11 and 12 and hollow helices 24 and 25. The condensed steam is removed through outlet 16. The maintenance of the proper temperature will depend to a large extent upon the concentration of the formaldehyde solution that is to be concentrated. At a formaldehyde solution concentration of 65% to 80% the moving bed of paraformaldehyde particles is advantageously maintained at 95° C. to 105° C., whereas at a concentration of from 85% to 91% formaldehyde the paraformaldehyde particle bed is preferably maintained at a temperature of 50° C. to 90° C. The degree of agitation of the particles in the moving bed will also affect to some extent the degree of heating, or in extreme cases possibly cooling of the moving bed of particles, less heat being necessary in the case of greater agitation.

The concentrated aqueous solution of formaldehyde is passed into the apparatus through pipe 17 and the caustic catalyst through pipe 18. These pipes are shown in enlarged cross-section in FIG. 5 to illustrate the preferred construction of the outlet ends of these pipes. As shown, both pipes end in nozzles 60 and 61. The concentrated formaldehyde solution passing through pipe 17 and the caustic catalyst passing through pipe 18 are mixed in the nozzle end 60 of pipe 17. It is important that these materials be brought together only at the last possible moment to prevent setting up of formaldehyde polymer and possibly plugging one or both of the nozzles. Preferably the materials are brought together at a distance no greater than about one inch from the outlet end of the nozzle. The mixed formaldehyde and catalyst start polymerizing almost immediately and the liquid mass can be flowed with considerable volume onto the moving bed of paraformaldehyde particles. Any gaseous unreacted formaldehyde may be withdrawn from the apparatus shell through lines 20 and 22, line 22 being a vacuum line pulling the formaldehyde to a scrubber for recovery purposes. Line 21 is a bleed line to bleed small amounts of air into the system to aid in adjusting reactor vacuum.

The temperature of the system may be controlled by adjusting the temperature and volume of steam passing through the shell jacket and journals and hollow helices. The temperature may be recorded on thermometer 19. The temperature may also be affected by the exothermic reaction of catalytic polymerization of the formaldehyde.

The formaldehyde solution should have a concentration of at least 65% and preferably at least 75%. Such concentrated solutions of formaldehyde will start polymerizing and setting up substantially immediately upon being mixed with a caustic catalyst. In fact, if contacted with a bed of continuously moving paraformaldehyde particles at a temperature of around 100° C., the concentrated formaldehyde solution will begin polymerizing almost immediately even without the use of a catalyst although at a considerably slower rate. Therefore, a catalyst, although preferred, is not essential.

The paraformaldehyde particles may be continuously removed by any desired means, for example, by flowing over an over-flow weir 14. The particles are in a constant state of both growth and attrition. The particles will of course vary some in size but will not grow to very large size, the largest being of the order of ½ inch in diameter. The larger particles will break up by attrition to furnish additional fine or small particles for coating and growth, so that the system tends to equalize in the continuous production of a granular product varying from about 4 mesh to about 60 mesh.

In FIG. 4 of the drawings, another form of apparatus is shown for maintaining a moving bed of paraformaldehyde particles. This apparatus is a conventional sigma blade kneader and comprises a closed container 40 supported by base supports 41 and 42 and containing a jacketed wall 43. A sigma blade agitator 48 is journalled in the sides of the container 40 and may be rotated by pulley 51 in any desired manner. The formaldehyde solution, with or without a caustic catalyst may be passed onto the moving bed of paraformaldehyde particles in the container through inlet 47 and unreacted formaldehyde and/or water vapor may be removed through outlet 46 and the granular mass of paraformaldehyde particles may flow from the container through overflow weir 49. The apparatus herein above-described and illustrated in the drawings is only representative in nature. Other apparatus by which a moving bed of paraformaldehyde particles is maintained and wherein a concentrated formaldehyde solution may be flowed onto the moving particles may be used to carry out the process of this invention.

The process of this invention may be carried out in accordance with the following example.

*Example*

A concentrated aqueous solution of formaldehyde containing of the order of 80% to 90% formaldehyde is flowed onto a continuously moving bed of paraformaldehyde particles. The paraformaldehyde particles are maintained at a temperature of between 50° C. and 105° C. Preferably, a very fine stream of caustic soda solution is mixed with the concentrated formaldehyde stream just prior to its flow from the apparatus to the paraformaldehyde particles. The total amount of caustic soda in the caustic feed is preferably between 0.01% and 0.5% by weight of the formaldehyde content of the formaldehyde feed. A 25% aqueous caustic soda solution was found to be somewhat more effective than a 12.5% solution, however, the aqueous caustic soda solution may contain between 50% and 90% water. Preferably, the process of this invention is carried out at a slight negative pressure, for example, 27 to 29 inches of mercury absolute. Still lower pressures will also be operative and may have an added advantage in permitting operation at a lower temperature.

Many other variations in the process of this invention have been carried out successfully. The feed strength of the formaldehyde solution has been varied between 73% and 83% formaldehyde by weight with the addition of an alkaline catalyst and feed strengths of 85% to 91% without the use of catalysts. The bed temperatures may be varied between 50° C. and 105° C. The alkaline catalyst may be composed of aqueous solutions of sodium or potassium hydroxides, carbonates, formates or acetates.

Throughout the specification and claims, any reference to parts, proportions and percentages refers to parts, proportions and percentages by weight unless otherwise specified.

Since it is obvious that many changes and modifications can be made in the above-described details without departing from the nature and spirit of the invention, it is to be understood that the invention is not to be limited to said details except as set forth in the appended claims.

The embodiments of the invention in which an exclusive property or privilege is claimed are defined as follows:

1. The process of preparing granular substantially dust-free paraformaldehyde from a concentrated aqueous solution of formaldehyde which comprises passing the formaldehyde solution of at least 65% formaldehyde onto a moving bed of paraformaldehyde particles maintained at a temperature of between 50° C. and 105° C. whereby to increase the mass of particles of a substantially constant average particle size and collecting the granular particles so produced.

2. The process of preparing granular substantially dust-free paraformaldehyde from a concentrated aqueous solution of formaldehyde which comprises passing the formaldehyde solution of at least 65% formaldehyde at a slightly sub-atmospheric pressure onto a moving bed of paraformaldehyde particles maintained at a temperature of between 50° C. and 105° C. whereby to increase the mass of particles of a substantially constant average particle size and collecting the granular particles so produced.

3. The process of preparing granular substantially dust-free paraformaldehyde from a concentrated aqueous solution of formaldehyde which comprises mixing an aqueous solution of an alkali metal catalyst with said concentrated aqueous solution of formaldehyde containing at least 65% formaldehyde and immediately thereafter, before said mixture can solidify, passing the same onto a moving bed of paraformaldehyde particles maintained at a temperature of between 50° C. and 105° C. whereby to increase the mass of particles of a substantially constant average particle size and collecting the granular particles so produced.

4. The process of preparing granular substantially dust-free paraformaldehyde from a concentrated aqueous solution of formaldehyde which comprises mixing with said concentrated aqueous solution of formaldehyde containing at least 65% formaldehyde a quantity of aqueous caustic soda solution containing 0.01% to 0.5% caustic soda by weight of said formaldehyde and immediately thereafter, before said mixture can solidify, passing the same onto a moving bed of paraformaldehyde particles maintained at a temperature of between 50° C. and 105° C. whereby to increase the mass of particles of a substantially constant average particle size and collecting the granular particles so produced.

5. The process of preparing granular substantially dust-free paraformaldehyde from a concentrated aqueous solution of formaldehyde which comprises mixing with said concentrated aqueous solution of formaldehyde containing at least 65% formaldehyde a quantity of 10% to 35% by weight of aqueous caustic soda solution containing 0.01% to 0.5% caustic soda by weight of said formaldehyde and immediately thereafter, before said mixture can solidify, passing the same onto a moving bed of paraformaldehyde particles maintained at a temperature of between 50° C. and 105° C. whereby to increase the mass of particles of a substantially constant average particle size and collecting the granular particles so produced.

References Cited in the file of this patent

UNITED STATES PATENTS 2,551,365    Craven                May 1, 1951